United States Patent
Aoki et al.

(10) Patent No.: US 12,384,369 B2
(45) Date of Patent: Aug. 12, 2025

(54) VEHICLE CONTROL DEVICE

(71) Applicant: TOYOTA JIDOSHA KABUSHIKI KAISHA, Toyota (JP)

(72) Inventors: Masakazu Aoki, Nagoya (JP); Yohsuke Hashimoto, Nagakute (JP); Satoshi Takamoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

(21) Appl. No.: 18/522,772

(22) Filed: Nov. 29, 2023

(65) Prior Publication Data

US 2024/0217515 A1 Jul. 4, 2024

(30) Foreign Application Priority Data

Dec. 28, 2022 (JP) ................. 2022-211454

(51) Int. Cl.
 *B60W 30/16* (2020.01)
(52) U.S. Cl.
 CPC ....... *B60W 30/162* (2013.01); *B60W 2540/10* (2013.01); *B60W 2554/802* (2020.02); *B60W 2720/10* (2013.01)
(58) Field of Classification Search
 CPC ....... B60W 2540/10; B60W 2554/802; B60W 2720/10; B60W 30/16; B60W 30/162
 See application file for complete search history.

(56) References Cited

U.S. PATENT DOCUMENTS

| | | | |
|---|---|---|---|
| 8,355,851 B2 | 1/2013 | Inoue et al. | |
| 8,370,040 B2 | 2/2013 | Inoue et al. | |
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |
| 10,017,178 B2 | 7/2018 | Morimoto et al. | |
| 10,118,617 B2 | 11/2018 | Urano et al. | |
| 10,486,698 B2 | 11/2019 | Masui et al. | |
| 2017/0072955 A1* | 3/2017 | Ediger | B60W 30/143 |
| 2018/0105171 A1* | 4/2018 | Tsuji | B60W 30/146 |
| 2019/0295419 A1 | 9/2019 | Tosa et al. | |
| 2023/0347883 A1* | 11/2023 | Rózsa | B60W 30/0956 |

FOREIGN PATENT DOCUMENTS

JP H07-108849 A 4/1995

* cited by examiner

*Primary Examiner* — Aniss Chad
(74) *Attorney, Agent, or Firm* — Dinsmore & Shohl LLP

(57) ABSTRACT

A vehicle control device includes: a processor configured to execute automated acceleration control for automatically controlling acceleration of a vehicle; and one or more sensors configured to detect an operation of a driver related to acceleration/deceleration of the vehicle. The processor is configured to detect, during a specific acceleration period in which a specific condition is satisfied and the vehicle is accelerated by the automated acceleration control, an acceleration change operation of the driver that intervenes to change a set acceleration set by the automated acceleration control. The specific condition indicates that a vehicle-to-vehicle distance or a vehicle-to-vehicle time between the vehicle and a preceding vehicle is equal to or greater than a threshold value or that there is no preceding vehicle. The processor is also configured to change the set acceleration for future acceleration based on a history of the detected acceleration change operation.

3 Claims, 2 Drawing Sheets

VEHICLE CONTROL DEVICE

CROSS-REFERENCES TO RELATED APPLICATION

The present disclosure claims priority under 35 U.S.C. § 119 to Japanese Patent Application No. 2022-211454, filed on Dec. 28, 2022, which is incorporated herein by reference in its entirety.

TECHNICAL FIELD

The present disclosure relates to a vehicle control device configured to execute automated acceleration control for automatically controlling acceleration of a vehicle.

BACKGROUND

JP H07-108849 A discloses an automated travel control device for a vehicle. The automated travel control device learns a driving method of a driver based on the situation around the subject vehicle and the travel state of the subject vehicle. According to the learning, the preference of each driver regarding the driving method of the vehicle is learned. Then, the automated travel control device controls the vehicle traveling based on a result of the learning.

SUMMARY

In order to more appropriately reflect a driving preference of a driver on the automated acceleration control that automatically controls acceleration of a vehicle, it is favorable to capture the driving preference for a scene in which the driving preference is likely to appear in the operation of the driver.

The present disclosure has been made in view of the problem described above, and an object thereof is to provide a vehicle control device that can realize automated acceleration control in which a driving preference of a driver is appropriately reflected.

A vehicle control device according to the present disclosure includes a processor and one or more sensors. The processor is configured to execute automated acceleration control for automatically controlling acceleration of a vehicle. The one or more sensors are configured to detect an operation of a driver related to acceleration/deceleration of the vehicle. The processor is configured to detect, during a specific acceleration period in which a specific condition is satisfied and the vehicle is accelerated by the automated acceleration control, an acceleration change operation of the driver that intervenes to change a set acceleration set by the automated acceleration control. The specific condition indicates that a vehicle-to-vehicle distance or a vehicle-to-vehicle time between the vehicle and a preceding vehicle is equal to or greater than a threshold value or that there is no preceding vehicle. The processor is also configured to change the set acceleration for future acceleration based on a history of the detected acceleration change operation.

According to the vehicle control device of the present disclosure, it is possible to realize the automated acceleration control in which the driving preference of the driver is appropriately reflected.

DETAILED DESCRIPTION

Embodiments of the present disclosure will be described with reference to the accompanying drawings.

1. Configuration of Vehicle

Figure 1:
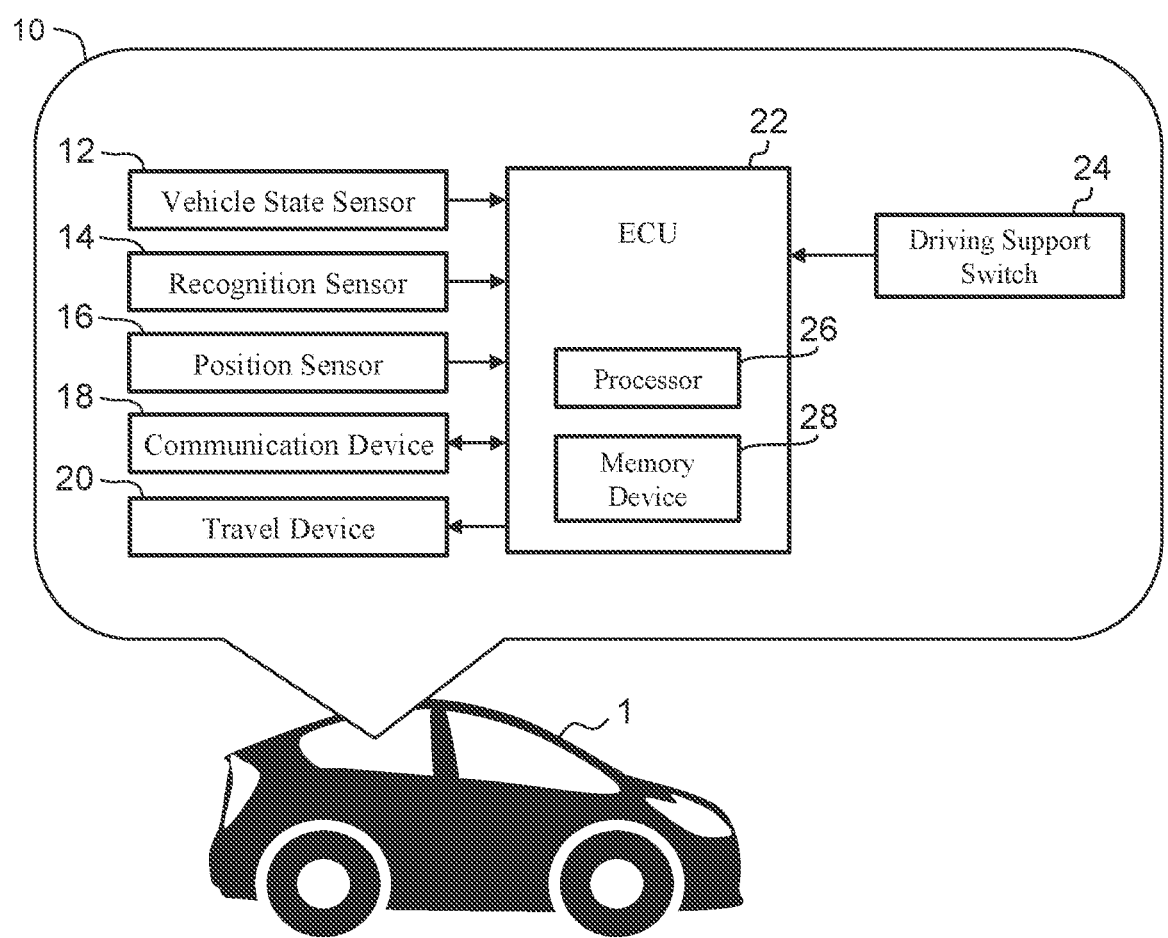
FIG. 1 is a diagram schematically illustrating an example of a configuration of a vehicle according to an embodiment.

FIG. 1 is a diagram schematically illustrating an example of a configuration of a vehicle 1 according to an embodiment. The vehicle 1 includes a vehicle control system 10. The vehicle control system 10 is mounted on the vehicle 1 and is configured to control traveling of the vehicle 1. The vehicle control system 10 includes a vehicle state sensor 12, a recognition sensor 14, a position sensor 16, a communication device 18, a travel device 20, an electronic control unit (ECU) 22, and a driving support switch 24.

The vehicle state sensor 12 detects a state of the vehicle 1. The vehicle state sensor 12 includes, for example, a vehicle speed sensor, a longitudinal acceleration sensor, an accelerator pedal sensor, a brake pedal sensor, and a steering angle sensor. The recognition sensor 14 recognizes (detects) a situation around the vehicle 1. The recognition sensor 14 includes, for example, a camera. The position sensor 16 detects a position and a direction of the vehicle 1. The position sensor 16 includes, for example, a global navigation satellite system (GNSS) receiver.

The communication device 18 communicates with the outside of the vehicle 1. The communication device 18 communicates with, for example, an external system and acquires various pieces of information. The information includes, for example, map information and traffic information. The map information includes road information, such as road gradient. The traffic information includes, for example, information on traffic congestion.

The travel device 20 is a device that operates the vehicle 1. For example, the travel device 20 includes a drive device, a brake device, and a steering device. The drive device includes, for example, at least one of an electric motor and an internal combustion engine for driving (accelerating) the vehicle 1. The brake device includes a brake actuator for braking (decelerating) the vehicle 1. The steering device includes, for example, a steering motor for steering the vehicle 1.

The ECU 22 is a computer configured to control the vehicle 1 and corresponds to an example of the "vehicle control device" according to the present disclosure. The ECU 22 includes a processor 26 and a memory device 28. The processor 26 executes various processes. The various processes include processes related to automated acceleration control described below. The memory device 28 stores various types of information necessary for processing by the processor 26. When the processor 26 executes computer programs, various processes by the ECU 22 are realized. The computer programs are stored in the memory device 28. Alternatively, the computer programs may be recorded on a computer-readable recording medium. In addition, the ECU 22 may be configured by combining a plurality of ECUs.

The vehicle control system 10 is configured to execute driving support control for supporting driving of the vehicle 1 by the driver. The driving support control according to the present embodiment includes the automated acceleration control for automatically controlling the acceleration (longitudinal acceleration) $G_x$ of the vehicle 1. More specifically, this automated acceleration control is included in, for example, automated follow-up control in which the vehicle 1 is caused to travel so as to follow a preceding vehicle while controlling a vehicle-to-vehicle distance D (or a vehicle-to-vehicle time) of the vehicle 1 with respect to the preceding vehicle. The automated follow-up control may be, for example, an adaptive cruise control (ACC) or may be realized by a so-called level 3 or higher automated driving function.

The driving support switch 24 is operated by the driver and is used to switch ON/OFF of the driving support control including the automated acceleration control.

2. Automated Acceleration Control (Driving Support Control)

In order to realize the automated acceleration control in which the driving preference of the driver is appropriately reflected, according to the present embodiment, the ECU 22 (processor 26) executes the following "operation detection process PR1" and "acceleration change process PR2".

In the operation detection process PR1, during a specific acceleration period Ta, the ECU 22 detects an acceleration change operation Oa of the driver that intervenes to change a set acceleration Gxs set by the automated acceleration control. The specific acceleration period Ta corresponds to a period in which a specific condition X is satisfied and acceleration of the vehicle 1 by the automated acceleration control is performed. Hereinafter, the acceleration of the vehicle 1 by the automated acceleration control is also referred to as "automated acceleration". The specific condition X indicates that the vehicle-to-vehicle distance D (or the vehicle-to-vehicle time) of the vehicle (subject vehicle) 1 with respect to a preceding vehicle is equal to or greater than a threshold value, or that there is no preceding vehicle on the traveling lane of the subject vehicle 1. That is, the specific condition X indicates that a traveling space is secured in front of the subject vehicle 1. In addition, the automated acceleration performed when the specific condition X is satisfied is basically performed such that vehicle speed V of the vehicle 1 reaches a designated set speed.

In the automated acceleration control, the set acceleration Gxs can be changed in, for example, three stages: low, medium, and high. However, the set acceleration Gxs may be changeable in two staged or four stages or more.

More specifically, the acceleration change operation Oa of the driver that intervenes to change the set acceleration Gxs includes an acceleration increase operation Oai and an acceleration reduction operation Oar. An operation of the accelerator pedal performed by the driver during the automated acceleration in order to increase the acceleration Gx with respect to the current set acceleration Gxs corresponds to the acceleration increase operation Oai. An operation of the brake pedal performed by the driver during the automated acceleration in order to reduce the acceleration Gx with respect to the current set acceleration Gxs corresponds to, for example, the acceleration reduction operation Oar. In addition, an operation in which the driver stops the automated acceleration control using the driving support switch 24 during the automated acceleration corresponds to another example of the acceleration reduction operation Oar. Therefore, in the example of the vehicle 1 illustrated in FIG. 1, not only the accelerator pedal sensor and the brake pedal sensor but also the driving support switch 24 corresponds to an example of the "one or more sensors configured to detect an operation of a driver related to acceleration/deceleration of the vehicle" according to the present disclosure.

In the acceleration change process PR2, the ECU 22 changes the set acceleration Gxs for future acceleration based on the history (or record) of the acceleration change operation Oa detected by the operation detection process PR1. To be more specific, the acceleration change process PR2 includes an "acceleration increase process" of increasing the set acceleration Gxs and an "acceleration reduction process" of reducing the set acceleration Gxs. The "future acceleration" is the next and subsequent automated accelerations. More specifically, the future acceleration is, for example, an automated acceleration that arrives between a time when the set acceleration Gxs is changed (increased or reduced) and a time when the set acceleration Gxs is changed next.

More concretely, the acceleration change process PR2 is executed, for example, as follows. That is, in the acceleration change process PR2, the ECU 22 uses first to third counters in order to grasp the history of the acceleration change operation Oa. The first counter is incremented when the acceleration change operation Oa is not performed during the specific acceleration period Ta. The second counter is incremented when the acceleration increase operation Oai as the acceleration change operation Oa is performed during the specific acceleration period Ta. The third counter is incremented when the acceleration reduction operation Oar as the acceleration change operation Oa is performed during the specific acceleration period Ta.

The ECU 22 basically increments any one of the first counter, the second counter, and the third counter each time the specific acceleration period Ta arrives. The counter values of the first counter, the second counter, and the third counter are referred to as C1, C2, and C3, respectively. Also, the total value of the three counter values C1 to C3 is referred to as C0. Therefore, the total value C0 increases by one each time the specific acceleration period Ta arrives. Each of the counter values C1 to C3 is stored in the memory device 28.

A ratio (=C2/C0) of the counter value C2 of the second counter to the total value C0 is referred to as a first ratio R1, and a ratio (=C3/C0) of the counter value C3 of the third counter to the total value C0 is referred to as a second ratio R2. That is, the first rate R1 indicates the number of specific acceleration periods Ta in which the acceleration increase operation Oai is performed among a predetermined number of specific acceleration periods Ta. Similarly, the second ratio R2 indicates the number of specific acceleration periods Ta in which the acceleration reduction operation Oar is performed among the predetermined number of specific acceleration periods Ta.

The acceleration increase process PR21 is executed when the first ratio R1 is equal to or greater than a threshold value TH1 and greater than the second ratio R2. On the other hand, the acceleration reduction process PR22 is executed when the second ratio R2 is equal to or greater than a threshold value TH2 and greater than the first ratio R1.

Further, in the present embodiment, if the specific condition X is not continuously satisfied from the start to the end of the specific acceleration period Ta even after the specific acceleration period Ta arrives, the ECU 22 does not increment any one of the first to third counters.

Furthermore, each of the first to third counters is cleared in association with the execution of the acceleration increase process PR21 or the acceleration reduction process PR22.

Figure 2:
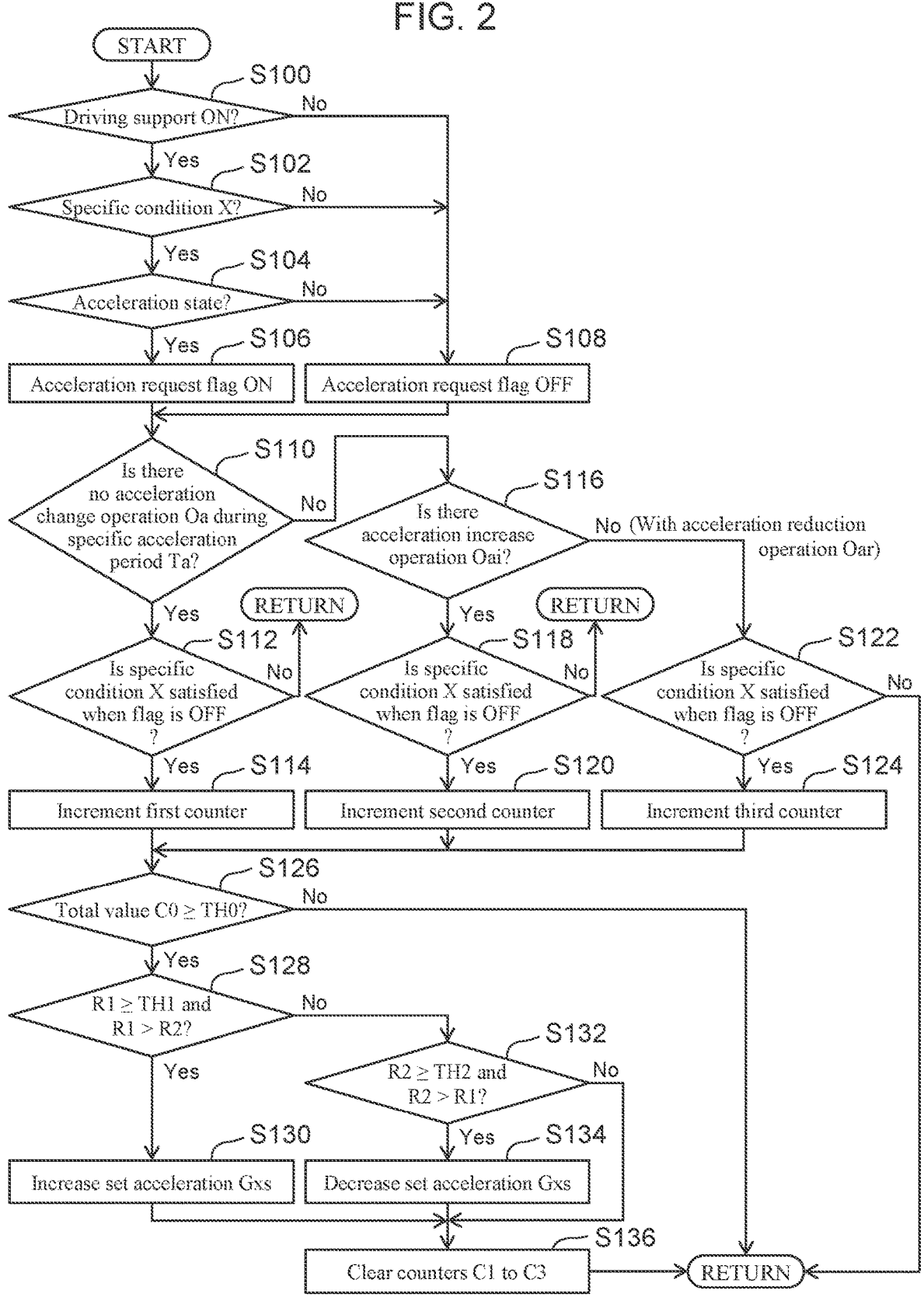
FIG. 2 is a flowchart illustrating an example of a flow of an operation detection process PR1 and an acceleration change process PR2 according to the embodiment.

FIG. 2 is a flowchart illustrating an example of a flow of the operation detection process PR1 and the acceleration change process PR2 according to the embodiment. The processing of this flowchart is repeatedly executed at a designated control cycle during activation of the vehicle control system 10.

In step S100, the ECU 22 (processor 26) determines whether or not the driving support control including the automated acceleration control is in operation based on, for example, the operation state of the driving support switch 24. As a result, when the driving support control is in operation (step S100; Yes), the processing proceeds to step S102. On the other hand, when the driving support control is not in operation (step S100; No), the processing proceeds to step S108.

In step S102, the ECU 22 determines whether or not the specific condition X described above is satisfied. Regarding this determination, the vehicle-to-vehicle distance D of the subject vehicle 1 with respect to the preceding vehicle is acquired using, for example, the recognition sensor 14. If the vehicle-to-vehicle time is used in place of the vehicle-to-vehicle distance D, the vehicle-to-vehicle time is calculated based on the vehicle-to-vehicle distance D and the vehicle speed V detected by the vehicle state sensor 12. The fact that there is no preceding vehicle is also determined using, for example, the recognition sensor 14. When the specific condition X is satisfied (step S102; Yes), the processing proceeds to step S104. On the other hand, when the specific condition X is not satisfied (step S102; No), the processing proceeds to step S108.

In step S104, the ECU 22 determines whether or not the vehicle 1 is in an acceleration state on the basis of, for example, a required acceleration in the automated acceleration control. As a result, when the vehicle 1 is in the acceleration state (S104; Yes), the processing proceeds to step S106. On the other hand, when the vehicle 1 is not in the acceleration state (step S104; No), the processing proceeds to step S108.

In step S106, the ECU 22 sets an acceleration request flag to ON. The fact that this acceleration request flag is ON indicates that the specific acceleration period Ta is coming. On the other hand, when the processing proceeds to step S108, the ECU 22 sets the acceleration request flag to OFF. After step S106 or S108, the processing proceeds to step S110.

In step S110, the ECU 22 determines whether or not a condition that the current time point is within the specific acceleration period Ta and the acceleration change operation Oa is not performed is satisfied. As a result, when this determination condition is satisfied (step S110; Yes), the processing proceeds to step S112.

In addition, in step S110, when the processing proceeds from step S108 to step S110 in the first control cycle in which the acceleration request flag is switched from ON to OFF, it is also determined that the current time point is within the specific acceleration period Ta. Thus, in the example of the driving support control configured such that the automated acceleration control is terminated when the brake pedal is operated by the driver during the automated acceleration, the presence or absence of this operation of the brake pedal (that is, the acceleration reduction operation Oar) can be determined in step S110.

In step S112, the ECU 22 determines whether or not a condition that the specific condition X is satisfied in the first control cycle in which the acceleration request flag is switched from ON to OFF is satisfied. That is, according to this determination, whether or not the specific condition X is continuously satisfied from the start to the end of the specific acceleration period Ta is determined.

When the determination condition of step S112 is not satisfied, the processing proceeds to RETURN. On the other hand, when the determination condition is satisfied, the processing proceeds to step S114. In step S114, the ECU 22 increments the first counter.

On the other hand, when the determination result in step S110 is No, that is, when the current time point is not in the specific acceleration period Ta and/or when the acceleration change operation Oa is performed, the processing proceeds to step S116.

In step S116, the ECU 22 determines whether or not the acceleration change operation Oa performed this time is the acceleration increase operation Oai. As a result, when this determination result is Yes, the processing proceeds to step S118. The determination condition of step S118 is the same as the determination condition of step S112. When the determination condition is satisfied, the ECU 22 increments the second counter in step S120.

On the other hand, when the determination result in step S116 is No, that is, when the acceleration change operation Oa performed this time is the acceleration reduction operation Oar, the processing proceeds to step S122. The determination condition of step S122 is the same as the determination condition of step S112. When the determination condition is satisfied, the ECU 22 increments the third counter in step S124.

After step S114, S120, or S124, the processing proceeds to step S126. In step S126, the ECU 22 determines whether or not the total value C0 of the first to third counters is equal to or greater than a designated threshold value TH0 (for example, 50). When the total value C0 has not reached the threshold value TH0 (step S126; No), the processing proceeds to RETURN. On the other hand, when the total value C0 has reached the threshold value TH0 (step S126; Yes), the processing proceeds to step S128. According to the processing of step S126, the driving preference of the driver can be captured with high accuracy by setting a plurality of acceleration scenes as the detection target of the acceleration change operation Oa.

In step S128, the ECU 22 determines whether or not the first ratio R1 related to the counter value C2 of the acceleration increase operation Oai is equal to or greater than a designated threshold value TH1 and greater than the second ratio R2. As a result, when this determination result is Yes, the ECU 22 executes the acceleration increase process PR21 in step S130. More specifically, the set acceleration Gxs is increased by one step.

On the other hand, when the determination result in step S128 is No, the processing proceeds to step S132. In step S132, the ECU 22 determines whether or not the second ratio R2 related to the counter value C3 of the acceleration reduction operation Oar is equal to or greater than a designated threshold value TH2 and greater than the first ratio R1. As a result, when this determination result is Yes, the ECU 22 executes the acceleration reduction process PR22 in step S134. More specifically, the set acceleration Gxs is reduced by one step.

After step S130 or S134, or when the determination result in step S132 is No, the processing proceeds to step S136. In step S136, the ECU 22 clears each of the first to third counters. As a result, the acquisition of the history of the acceleration change operation Oa during a period until the total value C0 reaches the threshold value TH0 again is started.

In addition, in the example of a vehicle including an operating device configured to change the set acceleration Gxs in response to the driver's operation, each of the first to third counters may be cleared also when the driver operates the operating device to change the set acceleration Gxs.

3. Effect

When a preceding vehicle is present near the subject vehicle 1 during execution of the automated acceleration control, the driver's operation that intervenes in the acceleration/deceleration of the vehicle 1 is likely to be affected by the preceding vehicle. That is, it cannot be said that the driver's intervention performed when a preceding vehicle is present near the subject vehicle 1 appropriately represents the driving preference of the driver.

In view of the above, according to the present embodiment, the detection of the acceleration change operation Oa is performed during the execution of the automated acceleration in which the specific condition X described above is satisfied, that is, during the specific acceleration period Ta. This makes it possible to acquire the history of the acceleration change operation Oa while taking care not to be affected by the preceding vehicle. That is, the history of the acceleration change operation Oa can be appropriately acquired by using scenes in which the driving preference of the driver is likely to appear. Therefore, it is possible to realize the automated acceleration control in which the driving preference of the driver is appropriately reflected.

To be more specific, according to the present embodiment, when the first ratio R1 related to the counter value C2 of the acceleration increase operation Oai is equal to or greater than the threshold value TH1 and greater than the second ratio R2, the acceleration increase process PR21 is executed. Thus, in order to determine whether or not to increase the set acceleration Gxs, not only the magnitude of the first ratio R1 is evaluated, but also the first ratio R1 is compared with the second ratio R2 related to the counter value C3 of the acceleration reduction operation Oar. This makes it possible to more reliably determine whether the driver's preference for the acceleration Gx is higher or lower than the current set acceleration Gxs. Further, the first ratio R1 and the second ratio R2 are the ratios of the counter values C2 and C3 to the total value C0 (=C1+C2+C3), respectively. Therefore, it is possible to determine whether or not to increase the set acceleration Gxs while also considering the number of times that the driver does not perform the acceleration change operation Oa. Thus, it is possible to prevent the set acceleration Gxs from being unnecessarily changed even though the driver prefers the current set acceleration Gxs. The same applies to the acceleration reduction process PR22. As described above, according to the method of the present embodiment, the driving preference of the driver can be accurately grasped and reflected in the automated acceleration control.

Moreover, when a preceding vehicle appears near the subject vehicle 1 during the specific acceleration period Ta, the presence or absence of the acceleration change operation Oa is affected by the preceding vehicle. That is, in this scene, the presence or absence of the acceleration change operation Oa is less likely to represent the driving preference of the driver. In view of this point, in the processing shown in FIG. 2, step S112 is interposed between step S110 and step S114. Similarly, step S118 is interposed between step S116 and step S120, and step S122 is interposed between step S116 and step S124. That is, if the specific condition X is not continuously satisfied from the start to the end of the specific acceleration period Ta even after the specific acceleration period Ta arrives, incrementing any one of the first to third counters is not performed. Thus, a scene in which a preceding vehicle appears near the subject vehicle 1 during the specific acceleration period Ta can be excluded from the processing targets of the steps S114, S120, and S124. Therefore, the driving preference of the driver can be acquired more accurately.

Furthermore, according to the present embodiment, each of the first to third counters is cleared in response to the execution of the acceleration increase process PR21 or the acceleration reduction process PR22. As a result, it is possible to accurately determine whether or not the set acceleration Gxs changed by the acceleration increase process PR21 or the acceleration reduction process PR22 matches the driving preference of the driver, compared to when the first to third counters are not cleared in this manner.

The invention claimed is:

1. A vehicle control device, comprising:
 a processor configured to execute automated acceleration control for automatically controlling acceleration of a vehicle; and
 one or more sensors configured to detect an operation of a driver related to acceleration/deceleration of the vehicle, wherein
 the processor is configured to:
  during a specific acceleration period in which a specific condition is satisfied and the vehicle is accelerated by the automated acceleration control, detect an acceleration change operation of the driver that intervenes to change a set acceleration set by the automated acceleration control, the specific condition indicating that a vehicle-to-vehicle distance or a vehicle-to-vehicle time between the vehicle and a preceding vehicle is equal to or greater than a threshold value or that there is no preceding vehicle; and
  change the set acceleration for future acceleration based on a history of the detected acceleration change operation,
 the processor includes:
  a first counter incremented when the acceleration change operation is not performed during the specific acceleration period;
  a second counter incremented when an acceleration increase operation as the acceleration change operation is performed during the specific acceleration period; and
  a third counter incremented when an acceleration reduction operation as the acceleration change operation is performed during the specific acceleration period, and
 the processor is configured to:
  increment any one of the first counter, the second counter, and the third counter each time the specific acceleration period arrives;
  execute an acceleration increase process of increasing the set acceleration when a first ratio of a value of the second counter with respect to a total value of the first counter, the second counter, and the third counter is equal to or greater than a first threshold value and greater than a second ratio of a value of the third counter with respect to the total value; and
  execute an acceleration reduction process of reducing the set acceleration when the second ratio is equal to or greater than a second threshold value and greater than the first ratio.

2. The vehicle control device according to claim 1, wherein
 the processor is configured not to increment any one of the first counter, the second counter, and the third counter if the specific condition is not continuously satisfied from a start to an end of the specific acceleration period even after the specific acceleration period arrives.

3. The vehicle control device according to claim 1, wherein the processor is configured to clear each of the first counter, the second counter, and the third counter in response to execution of the acceleration increase process or the acceleration reduction process.

* * * * *